2,826,595

DEPOLYMERIZATION OF DITHIO ACIDS

Milon W. Bullock, Pearl River, N. Y., and John J. Hand, New Milford, N. J., assignors to American Cyanamid Company, New York, N. Y., a corporation of Maine No Drawing. Application August 6, 1956
Serial No. 602,416

6 Claims. (Cl. 260—399)

This invention relates to a method of recovering monomeric dithioalkanoic acids from the corresponding polymeric dithioalkanoic acids.

In a copending application of one of us, Serial No. 284,205, filed April 24, 1952, there is described a method for the preparation of 6-thioctic acid (omega-[3-(1,2-dithiolanyl)] valeric acid and homologues thereof. In the preparation of these dithioacids, polymerized products are also obtained and may account for as much as fifty percent of the product obtained. This polymerization greatly decreases the yield of the dithio acids and makes the original process unfeasible commercially.

We have now found that the polymers of the dithio acids can be depolymerized to produce the dithiol acids by formation of a salt, for example, an alkali metal salt, followed by reduction. The reaction can be illustrated by the following equation:

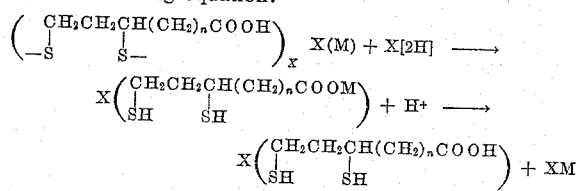

in which $n$ is a whole integer not less than 2 nor greater than 6, X is an integer, and M is a salt forming group. In the above reaction, the salt forming group can be, for example, alkali metal hydroxides, carbonates, ammonia, and amines capable of neutralizing the acid and forming a salt which is soluble in the solvent employed for the reduction reaction. On the other hand, the reduction can be carried out in an acid medium with a reducing agent such as an active metal capable of supplying molecular hydrogen. Under acid reduction, it is obviously not necessary to form a salt of the polymeric compounds or to have alkali present.

In carrying out the process of the present invention, we prefer to use as a reducing agent alkali metal borohydrides, such as sodium borohydride, potassium borohydride, etc. We can also use sodium in alcohol for an alkaline reduction or an acid reduction using zinc in acid.

The present process can be carried out at a temperature within the range of 0° C. to 150° C. The process is completed in a matter of several minutes to about twelve hours, depending somewhat on the temperature used. A convenient method of completing the reaction is to allow the reaction mixture to stand overnight.

The dithiolacids of the present invention are biologically active in themselves or can be converted into the corresponding intramolecular disulfides, described and claimed in the application mentioned hereinbefore. The latter compounds, such as 6,8-dithiooctanoic acid, have been found to be useful in the treatment of hepatic malfunction, cirrhosis of the liver, and similar conditions.

When it is desired to prepare the intramolecular disulfide, it is usually desirable to esterify the dithiol acid of the present invention and distill the ester to remove small amounts of impurities which retard crystallization of the final product. The purified esters can then be hydroylzed to the corresponding dithiol acid and oxidized, preferably in the form of a salt in aqueous solution, to the intramolecular disulfide. The aqueous solution is then acidified and the desired product recovered by extraction with a suitable solvent. The products so obtained can be further purified by distillation at reduced pressure and recrystallization from solvents to obtain an absolutely pure and stable product. The distilling and recrystallizing residues, which are largely polymeric materials, can be recycled through the process of the present invention, so that essentially all of the material will be recoverable in the form of the pure cyclic disulfide.

The following example illustrates the process of the present invention and the preparation of the intramolecular disulfide.

A quantity of polymeric recrystallization residues from 6,8-dithiooctanoic acid preparations totaling 435 g. (2.11 mole calculated as X=1) was dissolved in 2 liters of 95 percent ethanol, and 20 percent sodium hydroxide solution was added until the hydrogen ion concentration was at pH 8. Now 50 g. (1.3 moles) of sodium borohydride was added in two portions. The reduction was exothermic, and the reaction mixture was cooled in a cold water bath to prevent excessive temperature rises, foaming, and decomposition of the reducing agent. After standing overnight, the alcohol was distilled off and the residue was taken up in 2 liters of water. The aqueous solution was acidified with concentrated hydrochloric acid and dithiol acid was recovered by extraction with ether. The ether was evaporated, and the residue was esterified by refluxing two hours with a mixture of 2 liters of methanol and 100 ml. of 25 percent methanolic hydrogen chloride. The methanol was distilled off, and the residue was dissolved in 2 liters of ether. The ether solution was washed with water and with half-saturated sodium bicarbonate solution. The ether was evaporated and the ester purified by distillation. The fraction distilling at 158° C. at 8 mm. was collected as product. The yield of the methyl 6,8-dithioloctanoate was 399 g. (1.81 moles), 86%.

Two hundred and ninety-nine g. (1.34 moles) of this ester was saponified by refluxing with an excess of sodium hydroxide in aqueous solution. The aqueous solution of the sodium salt was adjusted to pH 7 with hydrochloric acid and 5 ml. of 10 percent ferric chloride was stirred in. The resulting dark purple solution was diluted so that the concentration of the salt of the acid was about 10 percent, and oxygen gas was passed into the rapidly stirring solution until the violet color changed to yellow, indicating that no more unoxidized mercaptan groups were present. Ethyl acetate was added to the aqueous solution and concentrated hydrochloric acid was added until the solution was well acidified. The organic layer was separated, dried with anhydrous sodium sulfate, and the solvent evaporated. The product was purified by distillation under reduced pressure. The fractions distilling about 177°–185° C. at 0.1 mm. were collected as product. The product crystallized on cooling. The yield of crystalline 6-thioctic acid was 230 g. (1.11 moles), 83%. This product was recrystallized from 700 ml. distilled peroxide-free n-butyl ether in the following manner. The mixture of the crude acid and the solvent was warmed slowly in a warm water bath to 45° C. with constant stirring. The solution was decanted from about 20 g. of polymeric material and allowed to cool to about 28° C. The solution was shaken with a small amount of decolorizing charcoal and filtered rapidly. The filtrate was allowed to crystallize at about 28° C. for several days and finally at lower temperatures. The recovery was 154 g. of pure 6-thioctic acid, melting point 61° C.

We claim:

1. A method of preparing compounds having the general formula:

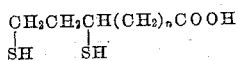

in which $n$ is a whole integer not less than 2 nor greater than 6, which comprises reacting a polymer having the following structure:

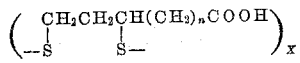

in which $n$ is as defined above and X is an integer, with an alkali metal hydroxide to form the corresponding alkali metal salt, subsequently reducing the said salt with an alkali metal borohydride, acidifying, and recovering said compound therefrom.

2. A method of preparing 6,8-dithioloctanoic acid which comprises reacting polymeric dithiooctanoic acid with an alkali metal hydroxide in solution and subsequently with an alkali metal borohydride, acidifying and recovering said product therefrom.

3. A method of preparing 6,8-dithioloctanoic acid which comprises treating a polymeric 6,8-dithiooctanoic acid with sodium hydroxide solution and an alkali metal borohydride, acidifying and recovering said product therefrom.

4. A method of preparing 6,8-dithioloctanoic acid which comprises treating polymeric 6,8-dithiooctanoic acid with an aqueous alcoholic-alkali metal hydroxide solution, subsequently reducing with sodium borohydride, acidifying and recovering said compound therefrom.

5. A method of preparing 6,8-dithioloctanoic acid which comprises dissolving polymeric 6,8-dithiooctanoic acid in ethanol and aqueous sodium hydroxide solution, treating said solution with sodium borohydride, subsequently acidifying and recovering said compound therefrom.

6. In a process of depolymerizing polymeric 6,8-dithiooctanoic acid, the steps which comprise treating said polymer with sodium borohydride in an aqueous alcoholic alkali metal hydroxide solution, subsequently purifying and oxidizing the resulting product and recovering 6-thioctic acid therefrom.

No references cited.